(12) United States Patent
Kokta et al.

(10) Patent No.: US 6,839,362 B2
(45) Date of Patent: Jan. 4, 2005

(54) COBALT-DOPED SATURABLE ABSORBER Q-SWITCHES AND LASER SYSTEMS

(75) Inventors: Milan R. Kokta, Washougal, WA (US); Dennis L. Peressini, Vancouver, WA (US); Jeffrey A. Cooke, Camas, WA (US); Kevin L. Goodnight, Camas, WA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 115 days.

(21) Appl. No.: 09/863,013

(22) Filed: May 22, 2001

(65) Prior Publication Data

US 2003/0007520 A1 Jan. 9, 2003

(51) Int. Cl.[7] .................................................. H01S 3/11
(52) U.S. Cl. .......................................... 372/10; 372/11
(58) Field of Search ................................. 372/10, 11, 92

(56) References Cited

U.S. PATENT DOCUMENTS

| | | | |
|---|---|---|---|
| 3,655,439 A | 4/1972 | Seiter | |
| 3,658,586 A | 4/1972 | Wang | |
| 3,796,597 A | 3/1974 | Porter et al. | |
| 3,883,313 A | 5/1975 | Cullen et al. | 23/301 |
| 4,177,321 A | 12/1979 | Nishizawa | |
| 4,627,064 A | 12/1986 | Auzel et al. | 372/41 |
| 4,963,520 A | 10/1990 | Yoo et al. | 502/64 |
| 5,530,267 A | 6/1996 | Brandle, Jr. et al. | 257/76 |
| 5,557,624 A * | 9/1996 | Stultz et al. | 372/11 |
| 5,654,973 A * | 8/1997 | Stultz et al. | 372/10 |
| 5,741,724 A | 4/1998 | Ramdani et al. | |
| 5,802,083 A * | 9/1998 | Birnbaum | 372/11 |
| 5,850,410 A | 12/1998 | Kuramata | |
| 5,982,796 A | 11/1999 | Kokta et al. | 372/41 |
| 6,023,479 A * | 2/2000 | Thony et al. | 372/11 |
| 6,104,529 A | 8/2000 | Brandle, Jr. et al. | 359/134.2 |
| 6,366,596 B1 * | 4/2002 | Yin et al. | 372/92 |

FOREIGN PATENT DOCUMENTS

EP    0 148 656 A1    7/1985

OTHER PUBLICATIONS

Yumashev, K.V., "Saturable absorber Co+2: MgAl2O4 crystal for Q switching of 1.34 Nd3: YalO3 and 1.54 Er3+:glass laser," Applied Optics, 38(30):6343–6346 (Oct. 20, 1999).*
Haisma, J., et al., "Lattice–Constant–Adaptable Crystallographics," *Journal of Crystal Growth*, 102:979–993 (1990) no month.
Nikishin, S.A., et al., "Gas Source Molecular Beam Epitaxy of GaN with Hydrazine on Spinel Substrates," *Applied Science Letters*, American Institute of Physics, 72:2361–2363 (1998) no month.

(List continued on next page.)

*Primary Examiner*—Paul Ip
*Assistant Examiner*—Hung T Vy
(74) *Attorney, Agent, or Firm*—Toler, Larson & Abel, LLP; Thomas G. Field, III

(57) ABSTRACT

A saturable absorber Q-switch includes a monocrystalline lattice having the formula $Mg_{1-x}Co_xAl_yO_z$ where x is greater than 0 and less than 1, y is greater than 2 and less than about 8, and z is between about 4 and 13. The lattice has tetrahedral and octahedral positions, and most of the magnesium and cobalt occupy tetrahedral positions. In one embodiment, the molar ratio of aluminum to the combined amount of magnesium and cobalt in the monocrystalline lattice can be controlled during growth of the monocrystalline lattice to thereby form a saturable absorber Q-switch that exhibits a $^4T_1$ spectrum for the cobalt ion of at least about 1544 μm. In another embodiment, a laser system, such as an Er:Yr:glass laser system, includes a saturable absorber Q-switch that includes a monocrystalline lattice wherein the molar ratio of aluminum to the combined amounts of magnesium and cobalt exceeds 2:1, and preferably is about 6:1, and wherein essentially all of the magnesium and cobalt components of the monocrystalline occupy tetrahedral positions of the lattice.

17 Claims, 3 Drawing Sheets-

OTHER PUBLICATIONS

Tamura, K., et al., "Epitaxial Growth of ZnO Films on Lattice–Matched SoAlMgO$_4$ (0001) Substrates," *Journal of Crystal Growth,* 214–215:59–62 (2000) no month.

Wyon, C., et al., "Czochralski Growth and Optical Properties of Magnesium–Alminum Spinel Doped with Nickel," *Journal of Crystal Growth,* 79:710–713 (1986) no month.

Kuleshov, N.V., et al., "Co–Doped Spinels: Promising Materials for Solid State Lasers," *SPIE 2138:*175–182, (1994) no month.

Kuleshov. N.V., et al., "Absorption and Luminescence of Tetrahedral Co$^{2+}$ ion in MgAl$_2$O$_4$," *Journal of Luminescence,* 55:265–269, (1993) no month.

Yumashev, K.V., et al., "Passive Q–Switching of 1.34–$\mu$m Neodymium Laser Using Co$^{2+}$:LiGa$_5$ and Co$^{2+}$:MgAl$_2$O$_4$," Poster presented at CLEO/Europe–IQEC Technical Program, Sep. 2000. IEEE Conference Digest for 2000 Conference on Laser and Electro–Optics Europe, Sep. 2000, Poster No. CTuK39.

Yumashev, K.V., et al., "Co$^{2+}$–Doped Spinels Saturable Absorber Q–Switches for 1.3–1.6 $\mu$m Solid State Lasers," *OSA Trends in Optics and Photonics. Advanced Solid State Lasers,* 34:236–239, Proceedings of Topical Meeting on Advancd Solid–State Laser (ASSL 2000) no month.

Tsuchiya, T., et al., "Epitaxial growth of InN films on MgAl$_2$O$_4$ (1 1 1) substrates," *J. of Crystal Growth* 220:185–190 (2000) no months.

Efimov, A.N., et al., "On an Unusual Azimuthal Orientation Relationship in the System Gallium Nitride Layer on Spinel Substrate," *Crystallography Reports,* 45(2):312–317 (2000) no months.

Yang, H.F. et al., "Microstructure evolution of GaN buffer layer on MgAl$_2$O$_4$ substrate," *J. of Crystal Growth* 193:478–483 (1998) no months.

Ohsato, H., et al., "Epitaxial orientation and a growth model of (0 0 1) GaN thin film on (1 1 1) spinel substrate," *J. of Crystal Growth 189/190:*202–207 (1998) no months.

Duan, S., et al., "MOVPE growth of GaN and LED on (1 1 1) MgAl$_2$O$_4$," *J. of Crystal Growth 189/190:*197–201 (1998) no months.

Nikishin, S.A., et al., "Gas source molecular beam epitaxy of GaN with hydrazine on spinel substrates," *App. Phys. Lett.* 72(19):2361–2363 (1998).

Sun, C.J., et al., "Mg–doped green light emitting diodes over cubic (1 1 1) MgAl$_2$O$_4$ substrates," *App. Phys. Lett.* 70(11):1444–1446 (1997) no month.

Efimov, A.N., et al., "Symmetry constraints and epitaxial growth on non–isomorphic substrate," *Thin Solid Films* 260:111–117 (1995) no month.

Kruger, M.B., et al., "Equation of state of MgAl$_2$O$_4$ spinel to 65 GPa," *Physical Review B Condensed Matter, Third Series* 56(1):1–4 (1997) no month.

George, T., et al., "Novel symmetry in the growth of gallium nitride on magnesium aluminate substrates," *Appl. Phys. Lett.* 68(3):337–339 (1996) no month.

Sun, C.J., et al., "Deposition of high quality wurtzite Gan films over cubic (1 1 1) MgAl$_2$O$_4$ substrates using low pressure and metalorganic chemical vapor deposition," *Appl. Phys. Lett.* 68(8):1129–1131 (1996) no month.

Nakamura, S., et al., "Characteristics of InGaN multi–quantum–well structure laser diodes," *Appl. Phys. Lett* 68(23):3269–3271 (1996) no month.

Kuramata, A., et al., "Properties of GaN Epitaxial Layer Grown on (1 1 1) MgAl$_2$O$_4$ Substrate," *Solid–State Electronics* 41(2):251–254 (1997) no month.

Khan, M.A., et al., "Cleaved cavity optically pumped InGaN–Gan laser grown on spinel substrates," *Appl. Phys. Lett.* 69(16):2418–2420 (1996) no months.

Tempel, A. and Seifert, W., "Nachweis von Stapelfehlern in GaN–Exitaxieschicten mittels Elektronenbeugung," *Kristall und Technik* 10(7):741–746 (1975) no months.

Gritsyna, V.T., et al., "Structure and Electronic States of Defects in Spinel of Different Compositions MgO.nAl$_2$O$_3$:Me," *J. Am. Ceram. Soc.* 82(12):3365–3373 (1999) no months.

Tempel, A., et al., "Zur Epitaxie von Galliumnitrid auf nichtstöchiometrischem Spinell im System GaCl/NH$_3$/He," *Kristall und Technik* 10(7):747–758 (1975) no months.

E. Hellman, "Exotic and Mundane Substrates for Gallium Nitride Heteroepitaxy," Bell Laboratories/Lucent Technologies (no date given) no months no year.

Sheldon, R.I., et al., "Cation Disorder and Vacancy Distribution in Nonstoichiometric Magnesium Aluminate Spinel, MgO.xAl$_2$O$_3$," *J. Am Ceram. Soc.* 82(12):3293–3298 (1999) no month.

K.V. Yumashev, "Saturable absorber Co$^{2+}$:MgAl$_2$O$_4$ crystal for Q switching of 1.34–$\mu$m Nd$^{3+}$:YAlO$_3$ and 1.54–$\mu$m Er$^{3+}$: glass lasers," *Applied Optics* 38(30):6343–6346 (1999) no month.

T.E. Mitchell, "Dislocations and Mechanical Properties of MgO–Al$_2$O$_3$ Spinel Single Crystals," *J. Am. Ceram. Soc.* 82(12):3305–3316 (1999) no month.

Camargo, M.B., et al., "Co$^{2+}$:Y$_3$Sc$_2$Ga$_3$O$_{12}$ (YSGG) Passive Q–switch for Infrared Erbium Lasers," submitted to LEOS in 1994 no month.

Mikhailov, V.P., et al., "Passive Q–switch performance at 1.3PLUS CODE 83 IS NOT DEFINED (1.5$\mu$) and nonlinear spectroscopy of Co$^{2+:\ MgAl_2}$O$_4$ and Co$^{2+}$: LaMgAl$_{11}$O$_{19}$ crystals," *OSA TOPS vol. 26 Advanced Solid–State Lasers,* pp. 317–324 (1999) no month.

Yumashev. K.V., "Saturable absorber Co$^{2+:MgAl_2}$ O$_4$ crystal for Q switching of 1.34–$\mu$m Nd$^3$: YAlO$_3$ and 1.54–$\mu$m Er$^{3+}$: glass lasers," *Applied Optics, 38(30)*:6343–6346 (Oct. 20, 1999).

Stulz, R.D., et al., "Divalent Uranium and Cobalt Saturable Absorber Q–switches at 1.5 $\mu$m," *OSA Proceedings on Advanced Solid–State Lasers,* 24:460–464 (1995) no month.

Birnbaum, M., et al., "Co$^{2+}$:ZnSe Saturable Absorber Q–Switch for the 1.54 $\mu$m Er$^{3+}$: Yb$^{3+}$:Glass Laser," *OSA TOPS vol. 10 Advanced Solid State Lasers,* pp. 148–151 (1997).

Machida, H. Fukuda, T., "Difficulties encountered during the Czochralski growth of TiO$_2$ single crystals," *Journal of Crystal Growth, 112:*835–837 (1991) no month.

Camargo, M.B., et al., "Broad–band 1.54 $\mu$m Saturable Absorber Q–switch with Co$^{2+}$," submitted to *ASSL* in 1995.

Yumashev, K.V., et al., "Nonlinear spectroscopy and passive Q–switching operation of a Co$^{2+}$:LaMgAl$_{11}$O$_{19}$ crystal," *J. Opt. Soc. Am. B, 16(12):*2189–2194 (1999).

* cited by examiner

COBALT-DOPED SATURABLE ABSORBER Q-SWITCHES AND LASER SYSTEMS

BACKGROUND OF THE INVENTION

Q-switching is a method for obtaining single laser pulses of very high power by protracting the period of population inversion of electrons in excited states just prior to emission. Extending the period of population inversions typically can be achieved acousto- or electro-optically by use of shutters, mechanically (with an orthogonal mirror or rotating mirror), or by use of saturable absorbers (in the form of dyes or doped crystals).

The term "Q-switching" is a reference to the fact that a "Q-factor" or "Quality factor," which can be defined as $v/\Delta v_c$, where v is cavity resonance frequency, and $\Delta v_c$ is cavity linewidth, shifts from a very low value to a very high value during laser pulse emission. More specifically, population inversion of electrons is extended by blocking emission from the laser cavity. At the time a laser pulse is to be emitted, the blockage is removed, thereby causing the threshold gain of electrons to be deliberately and suddenly reduced. Population inversion is much higher than the threshold gain value, and actual gain greatly exceeds cavity losses. As a result, the excited states are quickly depopulated, causing energy to be discharged in a single laser pulse. The sudden discharge causes actual gain to be reduced to a point below the threshold value, thereby terminating the pulse.

Saturable absorber Q-switches operate passively, whereby absorptivity of the laser wavelength decreases with increasing irradiance until "bleaching" occurs. Population inversion increases until the Q-switch is bleached, at which time the threshold value is reduced, resulting in a laser pulse. Passive Q-switches typically are easy to implement relative to other mechanisms. Historically, examples of saturable absorber Q-switches are dyes, such as bis 4-dimethyl aminodithiobenzyl-nickel (BDN) dissolved in 1,2 dichloroethane for Nd:YAG lasers, and gases, such as $SF_6$ for $CO_2$ lasers.

More recently, solid state Q-switches have been employed that include crystals doped with tetrahedrally coordinated $Co^{2+}$ ions as a tunable laser source in wavelengths that range from about 1.5 to about 2.3 $\mu$m. Among the crystals that have been doped with $Co^{2+}$ ions for 1.34 $\mu$m $Nd^{3+}$:YAlO$_3$ and 1.54 $\mu$m-$Er^{3+}$: glass lasers are $Y_3Al_5O_{12}$, $Y_3Sc_2Ga_3O_{12}$, $LaMgAl_{11}O_{19}$, $MgAl_2O_4$ (MALO) and ZnSe. $MgAl_2O_4$ crystals, otherwise known as spinel, include tetrahedral and octahedral positions. $Co^{2+}$ dopant ions displace $Mg^{2+}$ ions from tetrahedral positions of the crystal. The amount of $Co^{2+}$ ion dopant in $MgAl_2O_4$ crystals typically ranges from about 0.0003 atomic weight percent to about 0.05 atomic weight percent. However, the frequency of the peak emission of doped solid state passive Q-switches typically is not affected by the amount of dopant. Further, the efficiency of a Q-switch (and, thus, the power of the laser pulse) is significantly diminished if it does not have an absorption band that matches the lasing transition. For example, spinel having the empirical formula of $MgAl_2O_4$ and doped with $Co^{2+}$ typically has an absorption band ($^4T_1$ spectrum) of about 1536 nanometers (nm), whereas the lasing transition of Er:Yb:glass lasers is about 1540 nm. Generally, the efficiency of cobalt-doped spinel Q-switches in Er:Yb:glass and other lasers is limited by the difference in specific absorption bands from the lasing transition wavelengths of such lasers.

Therefore, a need exists to significantly diminish or eliminate the above-mentioned problems of cobalt-doped saturable absorber Q-switches.

SUMMARY OF THE INVENTION

This invention is directed to a cobalt-doped saturable absorber Q-switch, to a laser system that employs a cobalt-doped saturable absorber Q-switch, and to a method of forming a cobalt-doped saturable absorber Q-switch.

In one embodiment, the saturable absorber Q-switch includes a monocrystalline lattice having the formula $Mg_{1-x}Co_xAl_yO_z$ where x is greater than 0 and less than 1, y is greater than 2 and less than about 8, and z is between about 4 and about 13. The lattice has tetrahedral and octahedral positions, and most of the cobalt and magnesium occupies tetrahedral positions. In a preferred embodiment, essentially all of the cobalt and magnesium occupies tetrahedral positions of the monocrystalline lattice.

In a laser system of the invention, a laser resonator cavity has a resonant axis and a lasing element within the resonator cavity. Suitable means optically pump the lasing element. A saturable absorber Q-switch lies along the resonant axis of the laser resonator cavity. The Q-switch includes a monocrystalline lattice having a formula $Mg_{1-x}Co_xAl_yO_z$ where x is greater than 0 and less than about 1, y is greater than 2 and less than about 8, and z is between about 4 and about 13. The monocrystalline lattice has tetrahedral and octahedral positions, and most of the magnesium and cobalt occupy tetrahedral positions. In a preferred embodiment, essentially all of the magnesium and cobalt occupy tetrahedral position of the monocrystalline lattice. In one embodiment, the lasing element is an Er:Yb:glass laser (or any laser source of 1.5–1.6$\mu$ frequency). In another embodiment, the laser element is a $Nd^{3+}$:YAlO$_3$ lasing element.

A method of forming a monocrystalline lattice of a saturable absorber Q-switch of the invention includes forming a melt of magnesium, cobalt, aluminum and oxygen, wherein the molar ratio of magnesium:cobalt:aluminum is (1-x):x:y, where x is greater than 0 and less than about 1, and y is greater than 2 and less than 8. A spinel seed crystal is immersed in the melt and rotated at a rate in a range of between about 4 and about 12 revolutions per minute, while withdrawing the seed crystal from the melt at a rate in a range of between about 0.04"/hr and about 0.1"/hr to thereby form the monocrystalline lattice. In one embodiment, the melt is formed by combining MgO, $Co_3O_4$ and $Al_2O_3$ powders, and then heating the combined powders to a temperature sufficient to form the melt.

The present invention has several advantages. For example, the saturable absorber Q-switch of the invention includes a ratio of aluminum to magnesium that is greater than that of spinel ($MgAl_2O_4$) having an equal amount of cobalt dopant. Despite the relatively high ratio of aluminum to magnesium, most or essentially all magnesium and cobalt dopant occupy only tetrahedral positions of the crystal. Modification of the relative amount of aluminum to magnesium in the saturable absorber Q-switches of the invention enables adjustment of the $^4T_1$ spectrum of cobalt dopant to more closely match a peak of 1544 nanometers, which is the lasing wavelength of erbium:ytterbium:glass (Er:Yb:glass) lasers. In another embodiment, modification of the relative amount of aluminum to magnesium also enables emission of a band at about 1340 nanometers, which is about the lasing wavelength of $Nd^{3+}$:YAlO$_3$ lasers. Both emission bands can significantly increase the efficiency of saturable absorber Q-switches employed with such lasers. Also, the saturable absorber Q-switches of the invention generally are relatively stable at reduced temperatures, such as at about 8 Kelvin (K).

DETAILED DESCRIPTION OF THE INVENTION

The features and other details of the invention will now be more particularly described with reference to the accompanying figures and pointed out in the claims. It will be understood that the particular embodiments of the invention are shown by way of illustration and not as limitations of the invention. The principal features of this invention can be employed in various embodiments without departing from the scope of the invention.

In one embodiment, the invention is a laser system that employs a saturable absorber Q-switch having a monocrystalline lattice, wherein the monocrystalline lattice has a formula of $Mg_{1-x}Co_xAl_yO_z$, and wherein x is greater than 0 and less than about 1, y is greater than 2 and less than about 8, and z is between about 4 and about 13. The monocrystalline lattice of the saturable absorber Q-switch employed in the laser system of the invention has tetrahedral and octahedral positions, and most of the magnesium and cobalt occupy tetrahedral positions. Preferably, essentially all of the cobalt and magnesium occupy tetrahedral positions.

Figure 1:
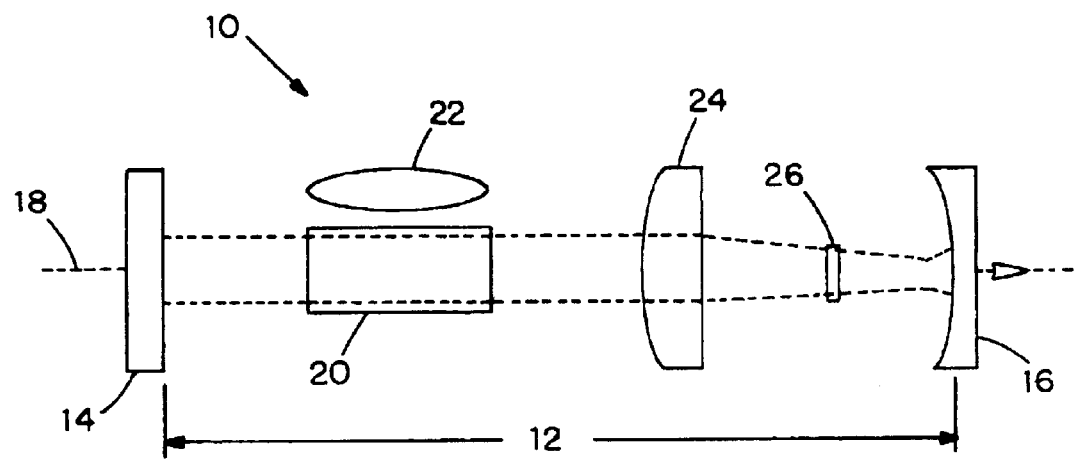
FIG. 1 is a schematic representation of one embodiment of the laser system of the invention, employing a cobalt-doped Q-switch of the invention.

An example of a laser system of the invention is shown in FIG. 1. As shown therein, laser system 10 includes resonator cavity 12. Resonator cavity 12 is defined by flat mirror 14 and outcoupler mirror 16. Flat mirror 14 and outcoupler mirror 16 are oriented along a resonant axis 18, whereby a light beam within resonator cavity 12 can operate in a cavity mode. Lasing element 20 is located along resonant axis 18 within resonator cavity 12. Typically, lasing element 20 is a cylindrical rod oriented parallel to resonant axis 18. Examples of suitable lasing elements include Er:Yb:glass (erbium:ytterbium:glass), Er:glass (erbium doped into a phosphate glass host) and $Nd^{3+}$:YAlO$_3$ (erbium doped into a yttrium-aluminum oxide host).

A suitable means for optically pumping the lasing element, optical pump 22, is proximate to lasing element. Focusing lens 24 is located between lasing element 20 and outcoupler mirror 16.

Q-switch 26 is located between focusing lens 24 and outcoupler mirror 16. Saturable absorber Q-switches of the invention include a monocrystalline lattice of a cobalt-doped spinel-like material wherein the molar ratio of aluminum to the sum of magnesium and cobalt components of the monocrystalline lattice exceeds 2:1. More specifically, the saturable absorber Q-switch of the invention includes a monocrystalline lattice having the formula $Mg_{1-x}Co_xAl_yO_z$ where x is greater than 0 and less than 1, y is greater than 2 and less than 8, and z is between about 4 and 13. A "1:1 spinel" refers to an embodiment wherein y is about 2. A "1:2 spinel" refers to an embodiment where y is about 4. A "1:3 spinel" refers to an embodiment where y is about 6. Most of the magnesium and cobalt of the saturable absorber Q-switch occupy tetrahedral positions of the monocrystalline lattice. In a preferred embodiment, essentially all of the cobalt and magnesium occupy tetrahedral positions.

In one embodiment of the invention, the monocrystalline lattice has a value of z of about 4. In another embodiment, y is about 4 and z is about 7. In still another embodiment, y is about 6 and z is about 10. Generally, the saturable absorber Q-switch has a $^4T_1$ spectrum between about 1537 nm and about 1544 nm. In one preferred embodiment, wherein the lasing element of the laser system of the invention is an Er:Yb: glass lasing element, the value of y is sufficient to cause the monocrystalline lattice of the saturable absorber Q-switch to have a $^4T_1$ spectrum of cobalt ion ($Co^{2+}$) to emit light at a wavelength of at least about 1.54 $\mu$m (1540 nm). In an especially preferred embodiment, the saturable absorber Q-switch has an absorption band of about 1544 nm.

In another preferred embodiment, such as wherein the lasing element is a $Nd^{3+}$:YAlO$_3$ lasing element, the value of y is sufficient to cause the monocrystalline lattice to have an absorption band of between about 1337 nm and about 1365 nm, such as an absorption band of 1337 nm, 1360 nm, 1365 nm or, most preferably, about 1340 nm.

In one embodiment, the excited state absorption for the cobalt ion in the saturable absorber Q-switch of the invention is about the same as that of a saturable Q-switch absorber wherein a molar ratio of aluminum to the combined magnesium and cobalt amount is about 2. Generally, the unit cell dimension of the monocrystalline lattice will be less than about 8.085 Å. In a preferred embodiment, the unit cell dimension is between about 7.970 Å and about 8.083 Å. In still another embodiment, the saturable absorber Q-switch of the invention has a decay time ($\tau_{31}$) greater than about $30 \times 10^{-6}$ seconds.

Typically, the amount of cobalt ion in the saturable absorber Q-switch of the invention is greater than about 0.02 atomic percent. Preferably, the amount of cobalt ion present is in an amount in a range of between about 0.02 and about 0.043 atomic percent of the monocrystalline lattice.

The saturable absorber Q-switches of the invention can be formed by use of a spinel seed ($MgAl_2O_4$) having a major axis oriented along the <111> axis. Preferably, the spinel seed is cylindrical. The crystal is grown, for example, in an inductively-heated ten kHz radiofrequency (RF) generator. Control of crystal growth can be maintained by use of suitable computer software, such as Automatic Diameter Control (ADC) software, commercially available from, for example, FEC Crystal Growing Systems, which can control the shape of the growing crystal, temperature increase, cooling rates, and other pertinent parameters. Crystal growth is commenced by heating a growth chamber of a suitable crucible, such as an iridium crucible, containing thoroughly mixed powders of magnesium oxide (MgO), cobalt oxide ($Co_3O_4$) and aluminum oxide ($Al_2O_3$). The growth chamber is heated to a suitable temperature, such as a temperature in a range of between about 1900° C. and about 2150° C. Preferably, the growth chamber is heated to a temperature of about 2150° C. to form a melt.

The spinel seed is immersed into the molten mixture and rotated while being withdrawn from the growth medium at a controlled rate. In one embodiment, the withdrawal rate is in a range of between about 0.25 and about 1.0 millimeters per hour at a rotation speed in a range of between about 4 and about 12 revolutions per minute (RPM). Preferably, the withdrawal rate is about 1 millimeter per hour and the rotation of the seed is about 8 RPMs. Crystal growth continues for a suitable period of time to form a monocrystalline lattice of suitable dimension. In one embodiment, crystal growth is continued for a period of about 150 hours.

Thereafter, the crystal is cooled to about 25° C. over a period of time in a range of between about 72 and about 100 hours. Preferably, the crystal is cooled from the melt temperature, of about 2150° C. to about 25° C. over a period of time of about 100 hours. Thereafter, the crystal can be machined by known methods to form the saturable absorber Q-switch of the invention.

The invention is illustrated by the following examples, which are not intended to be limiting in any way.

EXEMPLIFICATION

EXAMPLE 1

General Method for Spinel Growth

The various cobalt doped spinel compositions were grown on 1:1 ($MgAl_2O_4$) spinel seed oriented along the <111> axis. Desired compositions were melted in iridium crucibles of sizes appropriate for growth of 30 mm diameter, and 50 mm diameter crystals. The sizes of the melts for larger crystals were circa 3000 gms. The iridium crucibles were inductively heated by 10 kHz RF (radio-frequency) generators. The diameter control was based on controlling the growing crystals weight via controlling the generator output in accordance to the signal from a load cell. On an average, the melting point of the spinel was about 100 degrees higher than the melting point of sapphire. Prior to and during the growth, the melts were maintained under an ambient atmosphere strictly inert. The volatility of the Co oxide dopant was very low. The Co oxide apparently reacted with the spinel components on the heat up, and did not evaporate from the melt. The crystals of 1:1 and 1:2 compositions appeared to grow relatively easily, with linear growth rates exceeding 1–2 mm/hr. The charge preparation in a case of the 1:3 compound included a very thorough mixing of the constituent oxides. In addition, the results were sensitive to establishing a good equilibrium condition during seeding of the crystal, and also to the crystal growth rate.

EXAMPLE 1A

1:3 Spinel Growth

Composition
  206.05 gms of MgO
  0.41 gms of $Co_3O_4$
  1043.54 gms of $Al_2O_3$ The composition was mixed and loaded into 3" diameter 4-½" tall iridium crucible of 440 ml volume. The crucible was placed into growth system comprising RF (radio frequency), generator (power) supply, a growth chamber containing the RF coupling coil, zirconium oxide insulation material in an ambient gas enclosure—"Bell Jar," and an electronic control system. Control was accomplished by controlling the RF generator output in response to the mass of the growing crystal. "ADC" (Automatic Diameter Control) software, supplied by F. Bruni, controlled the shape of growing crystal, temperature increase, and cool down rates, and all other pertinent parameters. The crucible with the oxide mixture was heated to 2150° C. to form a melt. <111> spinel "seed" (small rod-shaped crystal) was immersed (dipped) into the molten mixture. Applying a withdrawal rate of 1 mm/hr along with rotation of the seed at 8 rpm, the crystal growth was started. Growth continued for 150 hours followed by a 100 hour cool down period. Result: A blue crystal, "Spinel" crystal structure, ¼" diameter, 7" long $A_0=8.012 A^0$ Optical measurement: O.D. (Optical Density): 0.7 $cm^{-1}$.

EXAMPLE 1B

1:2 Spinel Growth

Composition
  141.56 gms of MgO
  0.87 gms of $Co_3O_4$
  1107 gms of $Al_2O_3$

The composition was loaded into same crucible as described in Example #1, and placed in an identical growth system. Heat-up time was 6 hours to 2150° C. Rotation rate applied was 8 rpm, pull rate 1 mm/hr under strictly inert atmosphere. Growth time of 150 hours was followed by a 100 hour cool-down period. Grown crystal was harvested at room temperature.

Result: A blue crystal
  Structure: "Spinel"
    $A_0=7.97 A^0$
  Optical Density: 2.4 $cm^{-1}$

EXAMPLE 1C

1:1 Spinel Growth

Composition
  353.68 gms of MgO
  0.70 gms of $CO_2O_3$
  895.62 gms of $Al_2O_3$ Raw materials were mixed and loaded into an iridium crucible. The crucible was placed in the previously described system. Temperature was increased over a period of 6 hours to 2150° C. to complete melting. <111> spinel seed was immersed (dipped) into the melt. A withdrawal rate of 1 mm/hr, crystal growth was started. Growth continued for 150 hours followed by a 100 hour cool down period.

Result: A single crystal spinel ¼" diameter, 7" long
  Structure: "Spinel"
  Optical Density: 0.63 $cm^{-1}$

EXAMPLE 2

Experimental Details

Crystals of $MgAl_2O_4$, $MgAl_4O_7$, and $MgAl_6O_{10}$ doped with varying amounts of cobalt from 0.02 to 0.04 percent atomic cobalt were grown by the method described in Example 1. We labeled the different spinels according to 1:1 ($MgO.Al_2O_3$), 1:2 ($MgO.2Al_2O_3$), and 1:3 ($MgO.3Al_2O_3$). The structural analysis for each crystal gave unit cell dimensions of 8.083 Å for 1:1, 8.012 Å for 1:2, and 7.970 Å for 1:3. Each spinel belonged to the space group $O_h^7$-Fd3m with the $Mg^{2+}$ ions having tetrahedral coordination with full $T_d$ symmetry and the $Al^{3+}$ ions having octahedral coordination (P. R. Staszak, et al., *J. Phys C: Solid State Phys.*, 17:4751 (1984) and H. St. C. O'Neill and A. Navrotsky, *Am. Mineralogist*, 68:181 (1983), the teachings of which are incorporated herein by reference in their entirety). The lattice constant for 1:1 reported in the literature was 8.085 Å (R. D. Gillen and R. E. Salomon, *J. Phys. Chem.*, 74:4252 (1970), the teachings of which are incorporated herein by reference in their entirety). Previous studies, including thermodynamic phase diagram analyses of $MgO.nAl_2O_3$ and optical studies of $Co^{2+}$, showed a strong preference for $Co^{2+}$ in tetrahedral sites when the crystal had both tetrahedral and octahedral cation sites (A. Navrotsky and O. J. Kleppa, *J. Inorg. Nucl. Chem.*, 29:2701 (1967); A. Navrotsky and O. J. Kleppa, *J. Inorg. Nucl. Chem.*, 30:479 (1968); A. Navrotsky, et al., *J. Am. Ceramic Soc.*, 69:418 (1986); A. Navrotsky, *Am. Mineralogist*, 79:589 (1994); and N. V. Kuleshov, et al., *J. Luminescence*, 55:265 (1993), the teachings of which are incorporated herein by reference in their entirety). Our results, described infra, indicated that the tetrahedral site were preferred sites of occupation by $Co^{2+}$.

Polished samples used in spectroscopic measurements ranged from circular disks 4 cm in diameter and 0.5 cm thick, to rectangular pieces for low-temperature studies that measured 10 mm by 5 mm by 2.15 mm thick. Crystals having the optimum optical density at 1.54 μm were examined for use as saturable absorbers. Room temperature absorption spectra were obtained between 3000 nm and 300 nm with a Perkin-Elmer Lambda-nine spectrophotometer. Calibration of the instrument over the wavelength of interest indicated that spectral lines and bands were measured to an accuracy of 0.22 nm. The low temperature (8K) absorption spectrum was obtained with an upgraded Cary Model 14R spectrophotometer controlled by a desktop computer. The spectral bandwidth was set at 0.5 nm and the instrument was internally calibrated to an accuracy of 0.3 nm. Spectra were analyzed and plotted by using the computer software program Sigma Plot. Fluorescence spectra at room temperature and at 8K were also obtained by using the instrument together with appropriate mirrors and filters and a Spex Model 340 E monochromator. For fluorescence studies, excitation at 514.5 nm was provided by an argon ion laser.

For low-temperature studies, the sample was mounted at the cold finger of a CTI Model-22 closed-cycle helium cryogenic refrigerator capable of operation between 8K and room temperature. The sample temperature was monitored with a silicon-diode sensor attached to the base of the sample holder and maintained by using a Lake Shore control unit.

The fluorescence lifetime of the strongest emission band centered between 650 nm and 700 nm was measured by exciting each sample with the second harmonic (532 nm) of a Quanta-Ray pulsed Nd:YAG laser Model GCR-12S. The pulse width was about 6 ns and the beam divergence was less than 0.5 μrad. The output energy was 15 mJ at 10 Hz. The signal was detected by a photomultiplier tube attached to the exit slit of the monochromator and sent to a 150 MHZ Tektronix oscilloscope Model 2445A having a resolution of 10 ns.

Observed Spectra

The room temperature absorption spectrum of $Co^{2+}$ in the three spinel crystals is given in Table 1. The concentration of $Co^{2+}$ in each sample was 0.033% (atomic weight percent, or "at.") Co for 1:1, 0.02% at. Co for 1:2, and 0.0429% at. Co for 1:3. The general features in all three spectra were similar and consisted of two relatively strong bands centered near 600 nm and 1350 nm and weaker bands appearing between 550 nm and 470 nm, and between 2500 nm and 1900 nm (N. V. Kuleshov, et al., *J. Luminescence*, 55:265 (1993), the teachings of which are incorporated herein by reference in their entirety). However, comparable peaks and bands showed a noticeable shift to longer wavelengths from the 1:1 crystals to the 1:3 crystals. Of particular interest was the shift of the $^4T_1$ spectrum of $Co^{2+}$ in the 1:3 sample to wavelengths even more favorable for Q-switching at 1.54 μm than the saturable absorber $Co^{2+}:MgAl_2O_4$ (the 1:1 host crystal) (J. B. Gruber, et al., *Proc. of SPIE*, 3928:142 (2000), the teachings of which are incorporated herein by reference in their entirety). The peak at 1544 nm was observed where stimulated emission occurred in the Er:Yb:glass laser. Its estimated absorption cross section at this wavelength was higher than the value employed for $Co^{2+}:MgAl_2O_4$ ($4 \times 10^{-19}$ $cm^2$) and was considerably larger than the stimulated emission cross section of Qx/Er at 1535 nm ($0.6 \times 10^{-20}$ $cm^2$) (V. P. Mikhailov, et al., *OSA TOPS*, 21(*ASSL*):145 (1999); M. B. Carmargo, et al., *Opt. Letts*, 20:339 (1995); J. B. Gruber, et al., *Proc. of SPIE*, 3928:142 (2000); and R. Wu, et al., *OSA TOPS*, 22(*ASSL*):421 (2000), the teachings of which are incorporated herein by reference in their entirety). Excited state absorption (ESA) for $Co^{2+}$ near 1540 nm in 1:1 samples has been reported by several groups (V. P. Mikhailov, et al., *OSA TOPS*, 21(*ASSL*):145 (1999); M. B. Carmargo, et al., *Opt. Letts*, 20:339 (1995); and M. Birnbaum, et al. *OSA TOPS*, 19(*ASSL*):148 (1997)) including our group (J. B. Gruber, et al., *Proc. of SPIE*, 3928:142 (2000)) that has done extensive modeling studies on saturable absorbers. The ESA cross section for $Co^{2+}$ in the 1:3 compound, was similar to the value reported by $Co^{2+}$ in the 1:1 compound (M. B. Carmargo, et al, *Opt. Letts*, 20:339 (1995)).

Figure 2:
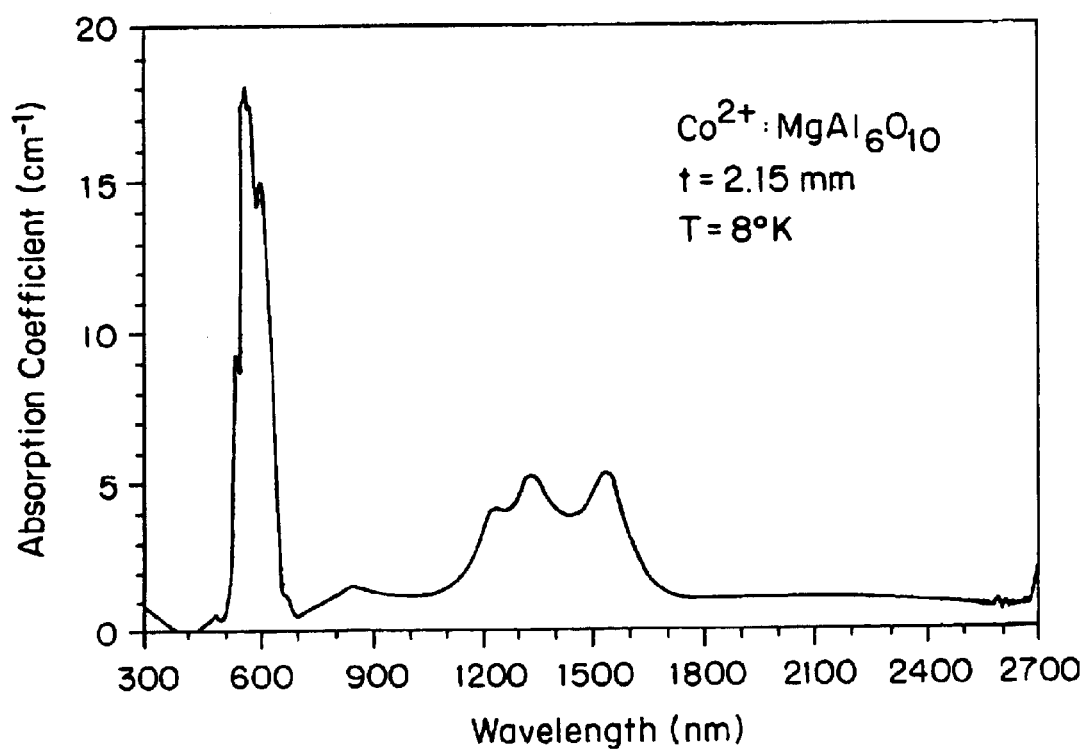
FIG. 2 shows light absorption in a 1:3 spinel as a function of wavelength at 8 Kelvin (K).
Figure 3:
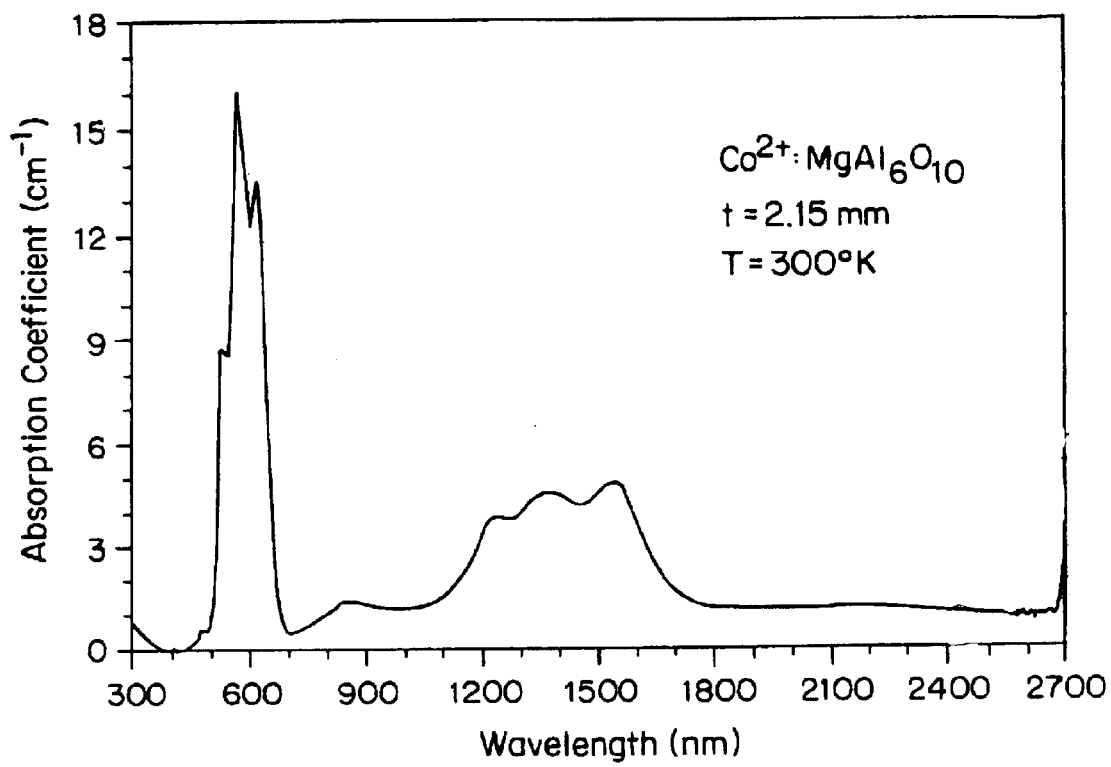
FIG. 3 shows light absorption in a 1:3 spinel as a function of wavelength at 300 Kelvin (K).

The similarity in the room temperature spectra of the three samples led us to examine the details of the absorption spectrum for $Co^{2+}:MgAl_4O_{10}$ at 8K. Table II presents the absorption spectrum between 2590 nm and 476.5 nm. FIGS. 2 and 3 show light absorption of the 1:3 spinel as a function of wavelength at 8 Kelvin and 300 Kelvin, respectively. The pattern of light absorption between 1200 mm and 1600 mm indicates possible use of this material for passive Q-switches for "eye-safe" (1.546μ (micron)) lasers, but also for lasers operating in a range of between about 1.3 and about 1.35 μ, which is useful in medicine as well as in optical communications business. The comparison at the two temperatures indicates that the material also is useful at room temperature. The observed spectra were similar to the spectra reported earlier for $Co^{2+}$ ions in tetrahedral sites in $MgAl_2O_4$ (N. V. Kuleshov, et al., *J. Luminescence*, 55:265 (1993), the teachings of which are incorporated herein by reference in their entirety). There were some differences in the magnitude of the crystal-field splitting of $Co^{2+}$ in tetrahedral sites which can be seen by comparing the energy levels in Table II., col. 5, with the energy levels of $Co^{2+}$ in $ZnAl_2O_4$, for which the data of Ferguson, et al. (J. Ferguson, et al., *J. Chem. Phys.*, 51:2904 (1969)) allowed us to do extensive modeling (J. B. Gruber, et al., *Proc. of SPIE*, 3928:142 (2000). Table II, Col. 2, shows the Tanabe-Sugano labels where ($^{2S+1}L$) represents the principal state (either quartet or doublet); the wavelength, absorption coefficient and the energy of the transition are given in Cols. 3–5. The energy-level calculations and modeling are described below.

Figure 4:
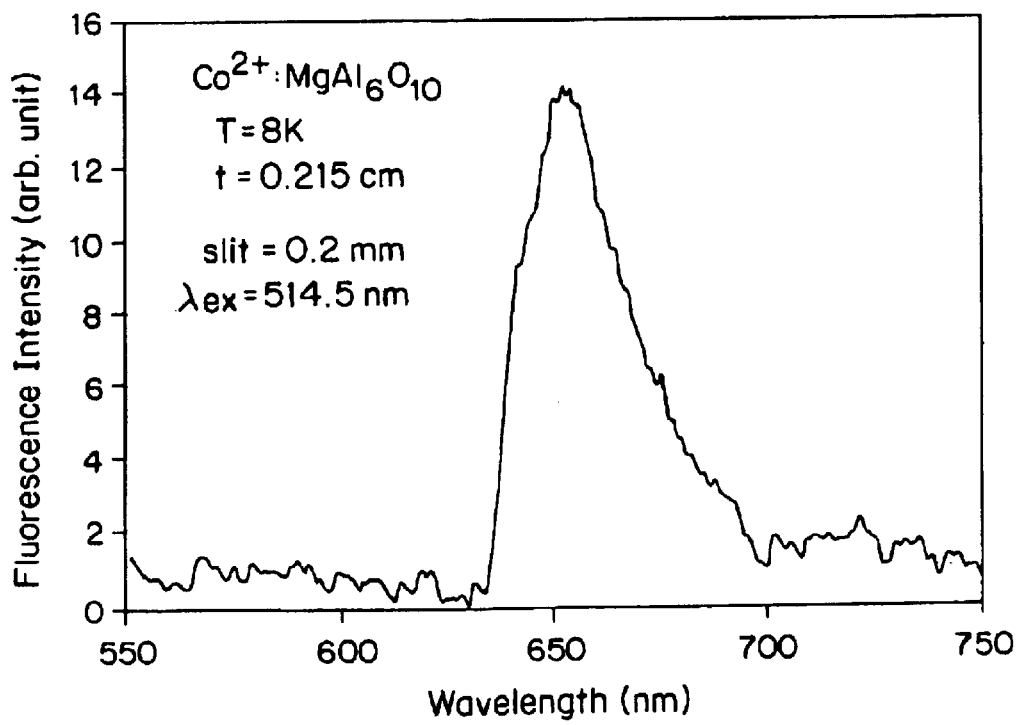
FIG. 4 shows fluorescence intensity of a 1:3 spinel as a function of wavelength at 8 Kelvin (K).
Figure 5:
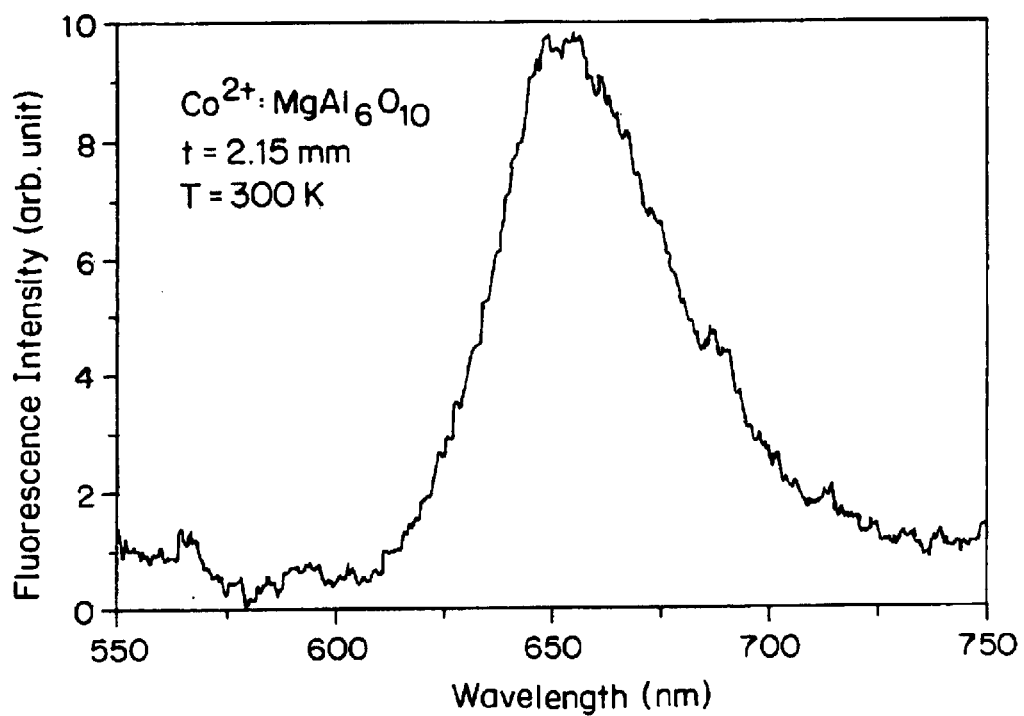
FIG. 5 shows fluorescence intensity of a 1:3 spinel as a function of wavelength at 300 Kelvin (K).
Figure 6:
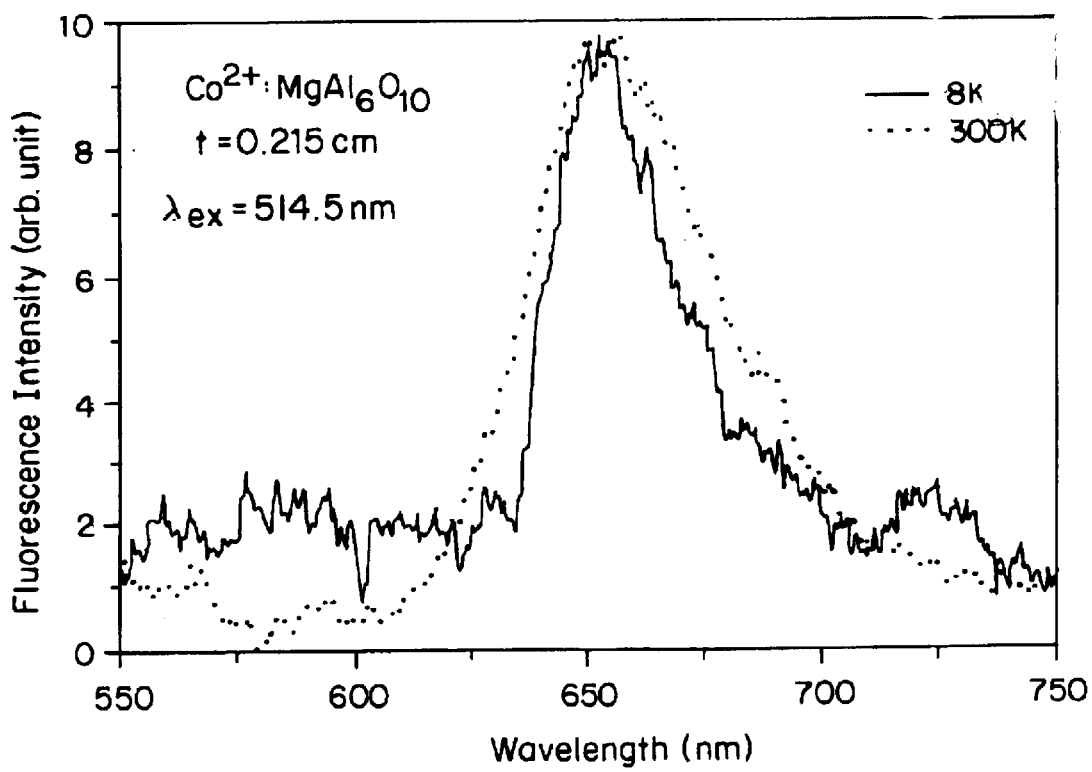
FIG. 6 is an overlay of FIGS. 4 and 5, as a comparison.

The fluorescence spectra at 8K and at 300K were characterized by a strong emission band between 600 nm and 700 nm. As can be seen in FIGS. 4, 5 and 6, fluorescence emissions as a function of wavelength of 1:3 spinels are comparable at 8 Kelvin and 300 Kelvin. These materials are useful as active materials for broadly tunable lasers. Also, two very weak, broad bands centered around 920 nm and 1300 nm which typically were observed only in more concentrated samples (N. V. Kuleshov, et al., *J. Luminescence*, 55:265 (1993)). The assignment of the transitions could be made with help from the analysis of the levels given in Table II. The strong red emission band centered at 660 nm was due to vibronic and electronic transitions from the $^2E$, $^4T_1$ excited states to the ground state, $^4A_2$, the weak broad band observed at 920 nm represented similar transition types from $^2E$, $^4T_1$ to the $^4T_2$ state, and the weak band around 1300 nm represented vibronic and electronic transitions from $^2E$, $^4T_1$ to the $^4T_1$ manifold observed in absorption between 1540 nm to 1230 nm. A weak band observed at 725 nm at 8K may have represented $^2A_1\square^4T_2$ transitions (see FIG. 5).

The room temperature fluorescence of the $Co^{2+}(^2E^4T_1)$ state was a single exponential, and the lifetime was measured to be about 30 μs. The emission intensity did not appear to change appreciably with decrease in temperature to 8K, and so we did not expect the low temperature lifetime to vary significantly from the room temperature value. Using crystals of the 1:1 sample containing between ten and twenty times more $Co^{2+}$ than we report, in Table II, for $Co^{2+}$: $MgAl_4O_{10}$, Kuleshov, et al. (N. V. Kuleshov, et al., *J. Luminescence*, 55:265 (1993)), found that the luminescence lifetime for all three bands was the same. The emission decay was strongly nonexponential and dependent on the temperature and $Co^{2+}$ ion concentration. However, their results were expected given the extent to which the $3d^7$ orbitals interacted with the lattice of the host crystal at such $Co^{2+}$ ion concentrations.

Energy Levels of $Co^{2+}$

The absorption spectra of $Co^{2+}$ ($3d^7$) in tetrahedral cation sites of the spinels consist of vibronically-coupled electronic transitions (including zero-phonon transitions) from the ground state $^4A_2(^4F)$ to excited quartet states such as $^4T_2(^4F)$ and $^4T_1(^4P)$, and excited doublet states, including $^2E(^2G)$, $^2T_1(^2G)$, $^2A_1(^2G)$, $^2T_1(^2P)$, and $^2T_2(^2H)$. The electronic (Stark) levels for the $3d^7$ configuration are determined using a Hamiltonian that consists of atomic and crystal-field terms (C. A. Morrison, "Crystal Fields for Transition-Metal Ions in Laser Host Materials," (Springer, N.Y.) (1992), the teachings of which are incorporated herein by reference in their entirety). The atomic or "free-ion" part is given as, $$\hat{H}_{FI} = \sum_{k=2,4} F^{(k)} \sum_{i>j}^n C''_{kq}(\hat{i}) C_{kq}(\hat{j}) + \alpha \hat{L}(\hat{L}+1) + \gamma G(\hat{R}_5) + \zeta_d \sum_j \hat{l}_l \cdot \hat{s}_l, \quad (1)$$

where $F^{(k)}$ are the Slater coulombic repulsion parameters between equivalent d electrons, $\alpha$ and $\gamma$ are interconfiguration parameters and $\zeta_d$ is the spin-orbit coupling parameter for the 3d electrons (C. A. Morrison, "Angular Momentum Theory Applied to Interactions in Solids," (Springer, N.Y.) (1988), the teachings of which are incorporated herein by reference in their entirety). The crystal-field terms for $Co^{2+}$ in tetrahedral sites are given as, $$\hat{H}_{CF} = B_{20} \sum_i C_{20}(\hat{i}) + B_{40} \sum_i C_{20}(\hat{i}) + B_{44} \sum_i \left[ C_{44}(\hat{i}) + C_{4-4}(\hat{i}) \right], \quad (2)$$

where the $B_{nm}$ represent crystal-field parameters that are related to the lattice-sum parameters, $A_{nm}$, through the three-parameter theory with $B_{nm}=\rho_n A_{nm}$ (C. A. Morrison, et al., *Chem. Phys.*, 154:437 (1991), the teachings of which are incorporated herein by reference in their entirety). The initial set of atomic and crystal-field parameters are listed in Table III and are obtained from several sources (C. A. Morrison, "Crystal Fields for Transition-Metal Ions in Laser Host Materials," (Springer, N.Y.) (1992). We treat $F^{(k)}$ and the three $B_{nm}$ parameters as adjustable, beginning with a set of $F^{(2)}$ and $F^{(4)}$ proposed originally by Morrison (C. A. Morrison, "Crystal Fields for Transition-Metal Ions in Laser Host Materials," (Springer, N.Y.) (1992)) and an initial set of $B_{nm}$ based on lattice-sum modeling using ion separations based on our x-ray crystallography studies of the spinel series.

Matrix elements for the Hamiltonian were computed using coefficients of fractional parentage for the $3d^7$ electronic configuration. The complete Hamiltonian was diagonalized in the basis states S,L, and the calculated levels for $Co^{2+}$ in $MgAl_6O_{10}$ are given as an example in Table II, Col. 6. The splitting of the ground-state, $^4A_2(^4F)$ was not fully resolved in the temperature-dependent spectra. The predicted splitting given in table II is 5 $cm^{-1}$. The observed splitting in $Co^{2+}$:$ZnAl_2O_4$, wherein $Co^{2+}$ occupies the $Zn^{2+}$ tetrahedral site, was 12 $cm^{-1}$ (J. Ferguson, et al., *J. Chem. Phys.*, 51:2904 (1969), the teachings of which are incorporated herein by reference in their entirety). Only one of the observed levels was used to establish the energy of the $^4T_2(^4F)$ state since the spectra of this manifold were very weak in the 0.0429% at Co spectrum reported in Table II. Longer pathlengths and greater concentrations of $Co^{2+}$ provided spectra that support the predicted levels 3 through 8 for this manifold splitting. Levels 15 through 25 showed a strong mixing of $^2G$ states into the $^4p$ states (Col. 7, Table II). Many of the zero-phonon transitions allowed in $T_d$ symmetry were obscured by the vibronic bands making it difficult to attempt an overall fitting of the observed-to-calculated energy levels. However, the continuity in general band shape and structure throughout the series was predicted very well, with the final set of spectroscopic parameters given in Table III.

TABLE I

Room temperature absorption bands of $Co^{2+}$ in $MgO.nAl_2O_3$

| | | $MgAl_2O_4$ | | | $MgAl_4O_7$ | | | $MgAl_6O_{10}$ | |
|---|---|---|---|---|---|---|---|---|---|
| STATE[a] | λ (nm)[b] | α[c] ($cm^{-1}$) | E ($cm^{-1}$)[d] | λ (nm)[b] | α ($cm^{-1}$)[c] | E ($cm^{-1}$)[d] | λ (nm)[b] | α ($cm^{-1}$)[c] | E ($cm^{-1}$)[d] |
| $^4T_2$ | 2519 | 0.03 | 3970 | 2556 | 0.04 | 3912 | 2580 | 0.05 | 3870 |
| | 2448 | 0.03 | 4085 | 2476 | 0.04 | 4039 | 2500 | 0.04 | 4000 |
| ($^4F$) | | | | 2365 (sh) | 0.05 | 4228 | 2390 (sh) | 0.05 | 4184 |
| | 2252 | 0.05 | 4441 | 2279 | 0.07 | 4388 | 2300 | 0.09 | 4347 |
| | 2163 | 0.03 | 4623 | 2190 (sh) | 0.05 | 4566 | 2220 (sh) | 0.06 | 4505 |
| $^4T_1$ | 1536 | 5.21 | 6510 | 1537 | 5.78 | 6506 | 1544 | 5.91 | 6476 |
| ($^4F$) | 1417 | 4.82 | 7057 | 1450 | 5.12 | 6897 | 1460 (sh) | 5.32 | 6849 |
| | 1350 | 5.03 | 7407 | 1360 | 5.32 | 7353 | 1365 | 5.50 | 7326 |
| | 1229 | 4.36 | 8137 | 1234 | 4.72 | 8104 | 1238 | 4.50 | 8077 |

TABLE I-continued

Room temperature absorption bands of $Co^{2+}$ in $MgO.nAl_2O_3$

| STATE[a] | $MgAl_2O_4$ | | | $MgAl_4O_7$ | | | $MgAl_6O_{10}$ | | |
|---|---|---|---|---|---|---|---|---|---|
| | $\lambda$ (nm)[b] | $\alpha$[c] (cm$^{-1}$) | E (cm$^{-1}$)[d] | $\lambda$ (nm)[b] | $\alpha$ (cm$^{-1}$)[c] | E (cm$^{-1}$)[d] | $\lambda$ (nm)[b] | $\alpha$ (cm$^{-1}$)[c] | E (cm$^{-1}$)[d] |
| $^2E$ ($^2G$) | 671 | 1.36 | 14900 | 672 | 1.28 | 14880 | 675 | 1.31 | 14815 |
| $^4T_1$ | 625 | 16.3 | 16000 | 626 | 14.3 | 15974 | 628 | 15.6 | 15923 |
| ($^4P$) | 598 | 15.9 | 16722 | 599 | 14.7 | 16694 | 598 | 15.2 | 16700 |
| | 580 | 17.1 | 17241 | 581 | 16.0 | 17211 | 583 | 17.2 | 17150 |
| $^2A_1$ | 545 | 2.8 | 18343 | 545 | 2.8 | 18348 | 546 | 2.6 | 18315 |
| ($^2G$) | | | | | | | | | |
| $^2T_1$ | 475 | 0.8 | 21053 | 476 | 0.7 | 21008 | 476.5 | 0.8 | 20986 |
| ($^2P$) | | | | | | | | | |

[a]Tanabe/Sugano label; principal state is given in parentheses.
[b]Wavelength is given in nanometers; sh denotes well-defined shoulder.
[c]Absorption coefficient is given in cm$^{-1}$
[d]Energy is given in wavenumbers.

TABLE II

Absorption spectra of $Co^{2+}$ in $MgAl_4O_{10}$ at 8 K[a]

| Level | State | $\lambda$ (nm)$_{abc}$ | $\alpha$ (cm$^{-1}$) | E (cm$^{-1}$) | Calc.[b] | Mixture SL States[c] |
|---|---|---|---|---|---|---|
| 1 | $^4A_2$ | | | 0 | -7 | 1.00 $^4F$ |
| 2 | ($^4F$) | | | | -2 | 1.00 $^4F$ |
| 3 | $^4T_2$ | 2590 | vwk | 3861 | 3728 | 0.98 $^4F$ + 0.01 $^4P$ + 0.01 $^1G$ |
| 4 | ($^4F$) | 2500 (b) | vwk | 4000 | 4019 | 0.99 $^4F$ + 0.01 $^2G$ |
| 5 | | 2400 (b) | vwk | 4166 | 4146 | 0.99 $^4F$ + 0.01 $^4P$ |
| 6 | | | | | 4411 | 0.99 $^4F$ + 0.01 $^4P$ |
| 7 | | 2231.5[d] | 1.11 | 4481 | 4544 | 0.99 $^4F$ + 0.01 $^4P$ |
| 8 | | 2110 | vwk | 4739 | 4713 | 0.99 + $^4F$ + 0.01 $^4P$ |
| 9 | $^4T_1$ | 1539[d] | 5.33 | 6498 | 6479 | 0.91 $^4F$ + 0.09 $^4P$ |
| 10 | ($^4F$) | 1460 (sh) | 4.82 | 6849 | 6854 | 0.86 $^4F$ + 0.13 $^4P$ + 0.01 $^2G$ |
| 11 | | 1337[d] | 5.24 | 7479 | 7507 | 0.99 $^4F$ + 0.01 $^4P$ |
| 12 | | | | | 7925 | 0.95 $^4F$ + 0.01 $^4P$ + 0.01 $^2D$ (2) |
| 13 | | 1241[d] | 4.17 | 8058 | 8065 | 0.91 $^4F$ + 0.08 $^4P$ + 0.01 $^2D$ (2) |
| 14 | | 1230 (sh) | 3.82 | 8130 | 8119 | 0.97 $^4F$ + 0.02 $^4P$ + 0.01 $^2D$ (2) |
| 15 | $^2E$ | 673[d] | 1.12 | 14860 | 14877 | 0.39 $^2G$ + 0.20 $^4P$ + 0.15 $^2P$ |
| 16 | ($^2G$) | 670 (sh) | 1.00 | 14925 | 14913 | 0.56 $^2G$ + 0.17 $^4P$ + 0.15 $^4F$ |
| 17 | $^4T_1$ | Band | 3.0 | 15267 | 15246 | 0.65 $^4P$ + 0.18 $^2G$ + 0.11 $^4F$ |
| 18 | ($^4P$) | Band | | unresolved band | 15356 | 0.45 $^2G$ + 0.18 $^2P$ + 0.15 $^4P$ |
| 19 | | Band | | | 15357 | 0.66 $^2G$ + 0.13 $^2D$ (2) + 0.09 $^2H$ |
| 20 | | Band | | | 15690 | 0.49 $^2G$ + 0.20 $^2P$ + 0.16 $^2H$ |
| 21 | | | | | 15718 | 0.48 $^4P$ + 0.24 $^2G$ + 0.14 $^2P$ |
| 22 | | 621[d] | 15.07 | 16103 | 16167 | 0.90 $^4P$ + 0.06 $^2G$ + 0.02 $^4F$ |
| 23 | | 605[d] | 16.1 | 16529 | 16451 | 0.67 $^4P$ + 0.22 $^2G$ + 0.04 $^2H$ |
| 24 | | 598 | 17.40 | 16722 | 16696 | 0.82 $^4P$ + 0.11 $^2G$ + 0.02 $^2H$ |
| 25 | | 583 (b) | 18.1 | 17150 | 16852 | 0.70 $^4P$ + 0.23 $^2G$ + 0.04 $^2H$ |
| 26 | $^2A_1$ | 552 (sh) | 11.0 | 18116 | 18080 | 0.65 $^2G$ + 0.21 $^4P$ + 0.07 $^2D$ (1) |
| 27 | ($^2G$) | 546[d] | 9.3 | 18315 | 18286 | 0.85 $^2G$ + 0.09 $^2D$ (2) + 0.03 $^2D$ (1) |
| 28 | | | | | 18389 | 0.87 $^2G$ + 0.05 $^2D$ (2) + 0.07 $^2H$ |
| 29 | | Band | | | 18746 | 0.63 $^2G$ + 0.24 $^2D$ (2) + 0.08 $^2D$ (1) |
| 30 | | | | | 19831 | 0.42 $^2G$ + 0.37 $^2P$ + 0.12 $^2H$ |
| 31 | | 500[d] | 0.7 | 20000 | 19870 | 0.43 $^2G$ + 0.40 $^2P$ + 0.09 $^2H$ |
| 32 | $^2T_1$ | 490 (sh) | 0.50 | 20408 | 20494 | 0.62 $^2P$ + 0.23 $^2G$ + 0.08 $^2H$ |
| 33 | ($^2P$) | 476.5[d] | 0.60 | 20986 | 20862 | 0.34 $^2H$ + 0.25 $^2G$ + 0.23 $^2D$ (2) |
| 34 | $^2T_2$ | | | | 21476 | 0.45 $^2H$ + 0.24 $^2D$ (2) + 0.18 $^2G$ |
| 35 | ($^2H$) | | | | 21906 | 0.41 $^2D$ (2) + 0.36 $^2H$ + 0.10 $^2D$ (1) |

[a]Sample contained 0.0429% at. Co.
[b]Parameters: $F^2$ = 61542, $F^4$ = 40168, $\alpha$ = 108, $\zeta_d$ = 515, $B_{20}$ = 3949, $B_{40}$ = −9081, $B_{44}$ = 5242 ($Co^{2+1}$ in tetrahedral sites).
[c]Mixture of $^{2S+1}L$ states in the wave function of the energy level.
[d]Levels used in calculations.

TABLE III

Spectroscopic parameters for $Co^{2+}$ in $T_d$ sites[a]

| Parameter | MgAl$_2$O$_4$ | | MgAl$_4$O$_7$ | | MgAl$_6$O$_{10}$ | |
|---|---|---|---|---|---|---|
| | Initial value (cm$^{-1}$)[b] | Final Value (cm$^{-1}$) | Initial Value (cm$^{-1}$)[c] | Final Value (cm$^{-1}$) | Initial Value (cm$^{-1}$)[d] | Final Value (cm$^{-1}$) |
| $F^{(2)}$ | 59367 | 59746 | 60520 | 61050 | 61045 | 61542 |
| $F^{(4)}$ | 42210 | 41946 | 41843 | 41325 | 41705 | 40168 |
| $B_{20}$ | 2720 | 2566 | 2641 | 2814 | 3119 | 3949 |
| $B_{40}$ | −8640 | −8693 | −8714 | −8920 | −9267 | −9081 |
| $B_{44}$ | 5163 | 5120 | 5092 | 5040 | 5171 | 5242 |
| $\zeta_d$ | 420 | 420 | 537 | 537 | 515 | 515 |
| $\alpha$ | 86 | 86 | 108 | 108 | 108 | 108 |

[a]Only $F^{(2)}$, $F^{(4)}$, and $B_{nm}$ parameters varied, within each spinel
[b]C. A. Morrison, "Crystal Fields for Transition-Metal Ions in Laser Host Materials" (Springer, New York) (1992).
[c]C. A. Morrison, unpublished (1996).
[d]C. A. Morrison, unpublished (1996).

Modeling of Crystals as Saturable Absorbers $Co^{2+}$ has been modeled as a saturable absorber for passively Q-switching the eyesafe (1.54 μm) Er:Yb:glass laser (J. B. Gruber, et al., *Proc. of SPIE*, 3928:142 (2000)). The model makes use of the rate equations based on quasi-three level gain medium and a four-level absorber that includes excited-state absorption (ESA). The model was expanded to include energy transfer between Yb and Er and excited state absorption in the gain medium. The spectroscopic parameters for the various gain media are available in the open literature (J. B. Gruber, et al., *Proc. of SPIE*, 3928:142 (2000), the teachings of which are incorporated herein by reference in their entirety)). For the saturable absorber $Co^{2+}$:MgAl$_6$O$_{10}$, which we modeled recently, we used concentrations equivalent to that reported in the present study; an index of refraction we determined near 1.54 μm (1.742); an experimental $\sigma(gs)=5.2\times10^{-19}$ cm$^2$; an experimental $\sigma(es)=1.87\times10^{-19}$ cm$^2$, and a delay time ($\tau_{31}$) of $30\times10^{-6}$ s.

The 1:3 material is a better performer as a saturable absorber than 1:1 and 1:2 spinels given comparable $Co^{2+}$ ion concentrations and a laser cavity design that is the same for all three spinel samples.

In summary, all members of the series may prove to be efficient high performance absorbers for Q-switching at the 1:54 μm wavelength.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A laser system, comprising:
   a) a laser resonator cavity defined by a flat mirror and an outcoupler mirror, said flat mirror and said outcoupler mirror oriented to form an optical resonant axis;
   b) a lasing element within the laser resonator cavity;
   c) optical pumping means proximate to said lasing element; and
   d) a saturable absorber Q-switch lying along the resonant axis, said Q-switch including a monocrystalline lattice spinel crystal structure and chemical composition $Mg_{1-x}Co_xAl_yO_z$, wherein x is greater than 0 and less than about 1, y is greater than 2 and less than about 8, and z is between about 4 and about 13, wherein the molar ratio of magnesium:cobalt:aluminum is (1−x):x:y, wherein x is greater than 0 and less than about 1, y is greater than 2 and less than about 8, said lattice having tetrahedral and octahedral positions, and wherein most of the magnesium and cobalt occupy tetrahedral positions.

2. The laser system of claim 1, wherein essentially all of the magnesium and cobalt occupy tetrahedral positions.

3. The laser system of claim 2, wherein the saturable absorber Q-switch has an absorption band within about 4 nm of the lasing transition of the lasing element.

4. The laser system of claim 3, wherein the saturable absorber Q-switch has an absorption band within about 2 nm of the lasing transition of the lasing element.

5. The laser system of claim 2, wherein the lasing element is an Er:Yb:glass or $Er^{3+}$:glass lasing element.

6. The laser system of claim 5, wherein the saturable absorber Q-switch has an absorption band of about 1537 nm.

7. The laser system of claim 5, wherein the saturable absorber Q-switch has an absorption band of about 1544 nm.

8. The laser system of claim 2, wherein the lasing element is a $Nd^{3+}$:YAlO$_3$ lasing element.

9. The laser system of claim 8, wherein the saturable absorber Q-switch has an absorption band of about 1360 nm.

10. The laser system of claim 8, wherein the saturable absorber Q-switch has an absorption band of about 1365 nm.

11. The laser system of claim 8, wherein the saturable absorber Q-switch has an absorption band of about 1337 nm.

12. The laser system of claim 8, wherein y is about 4 and z is about 7.

13. The laser system of claim 2, wherein the unit cell dimension of the saturable absorber Q-switch is between about 7.970 Å and about 8.083 Å.

14. The laser system of claim 13, wherein y is about 2 and z is about 4.

15. The laser system of claim 13, wherein y is about 6 and z is about 10.

16. The laser system of claim 13, wherein cobalt is present in the monocrystalline lattice in an amount between about 0.020 atomic weight percent and about 0.043 atomic weight percent.

17. The laser system of claim 2, wherein saturable absorber Q-switch has a decay time, $\tau_{31}$, greater than about $30\times10^{-6}$ seconds.

* * * * *